(No Model.) 2 Sheets—Sheet 1.
J. G. W. ROMANS & A. D. GROVER.
FRAUD PREVENTING DEVICE FOR COIN CONTROLLED MACHINES.
No. 603,741. Patented May 10, 1898.
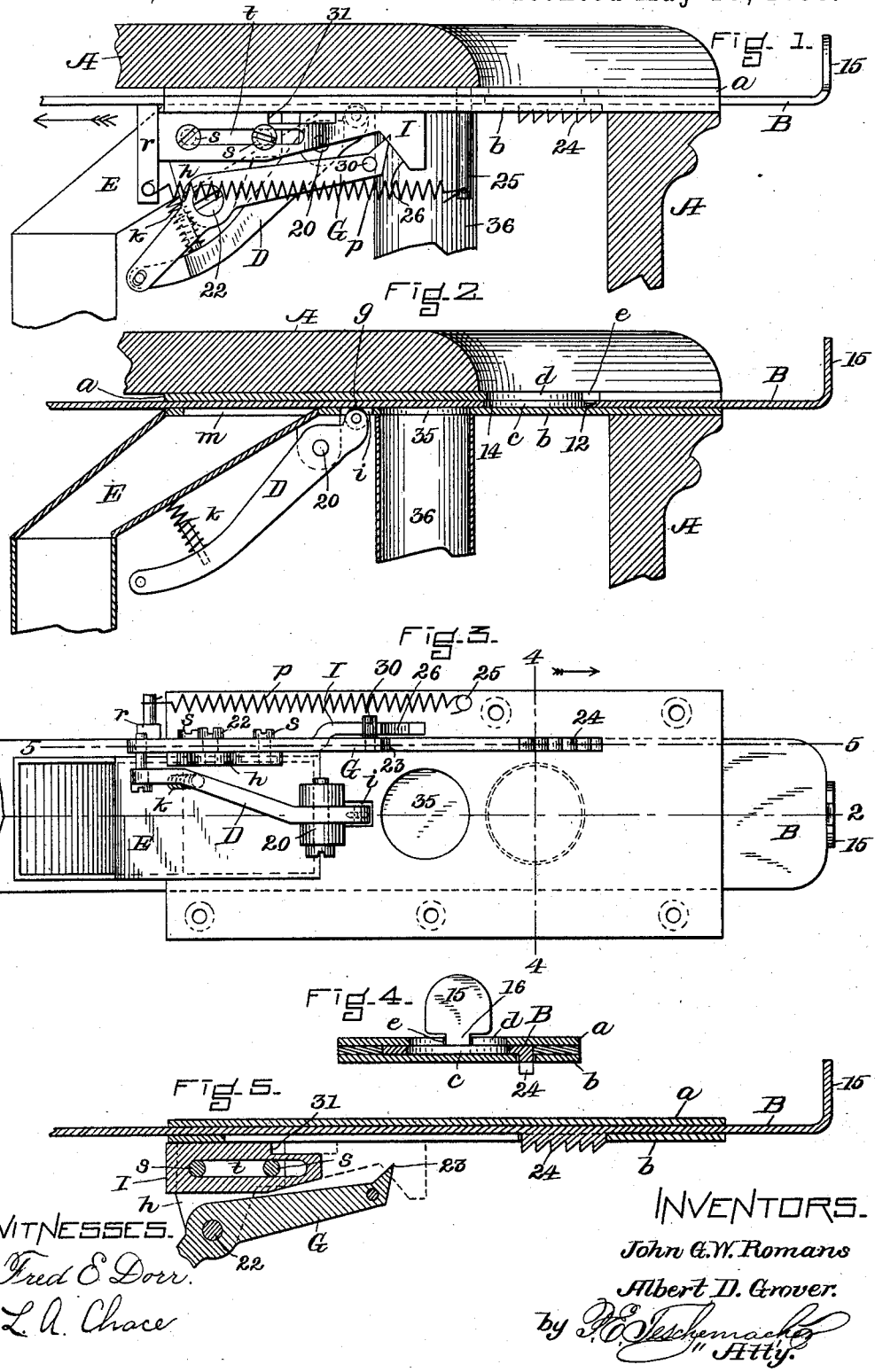
WITNESSES.
Fred E. Dorr.
L. A. Chace.
INVENTORS.
John G. W. Romans
Albert D. Grover.
by  Teschemacher
Atty.

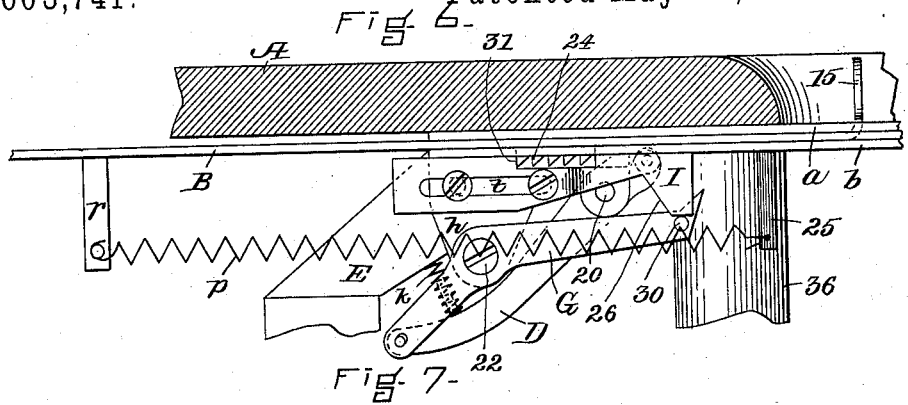

UNITED STATES PATENT OFFICE.

JOHN G. W. ROMANS, OF WEYMOUTH, AND ALBERT D. GROVER, OF MALDEN, MASSACHUSETTS.

FRAUD-PREVENTING DEVICE FOR COIN-CONTROLLED MACHINES.

SPECIFICATION forming part of Letters Patent No. 603,741, dated May 10, 1898.

Application filed December 14, 1897. Serial No. 661,835. (No model.)

*To all whom it may concern:*

Be it known that we, JOHN G. W. ROMANS, residing at Weymouth, in the county of Norfolk, and ALBERT D. GROVER, residing at Malden, in the county of Middlesex, State of Massachusetts, citizens of the United States, have invented an Improved Fraud-Preventive Device for Coin-Controlled Machines or Apparatus, of which the following is a specification.

Our invention has for its object to provide a simple and effective fraud-preventive device for coin operated or controlled machines or apparatus of all descriptions, whereby the operating of the apparatus or machine by means of coins of less than the required thickness or diameter or by means of washers or by disks or pieces of pasteboard, lead, or other soft material of the proper size is effectually prevented, thereby avoiding the loss and inconvenience hitherto experienced from this cause.

Another object of our invention is to prevent the coin-receiving mechanism from becoming clogged or obstructed by the introduction of foreign substances, which has hitherto been a source of annoyance and loss by rendering the apparatus inoperative until again put in order by an authorized person, the apparatus being meanwhile deprived of its earning capacity.

Our invention is designed to overcome all of the above-mentioned difficulties and objections; and it consists in certain novel features and combinations of parts, as will be hereinafter fully described, and specifically pointed out in the claims.

In the accompanying drawings, Figure 1 is an elevation of our fraud-preventive device for coin-operated apparatus, a portion of the casing being shown in section. Fig. 2 is a longitudinal vertical section on the line 2 2 of Fig. 3, the feeling-lever being shown in full. Fig. 3 is a plan view of the under side of the same. Fig. 4 is a transverse vertical section on the line 4 4 of Fig. 3. Fig. 5 is a longitudinal vertical section on the line 5 5 of Fig. 3. Fig. 6 is an elevation similar to that shown in Fig. 1, with the parts in a different position. Fig. 7 is a plan view of a portion of the top of our device. Fig. 8 is an inverted plan of a modified construction of our improved device. Fig. 9 is an enlarged vertical section on the line 9 9 of Fig. 7. Fig. 10 is an enlarged end elevation of one end of the feeling-lever.

Referring to the drawings, A represents a portion of the exterior casing of a coin-operated apparatus, which may be of any desired description.

B is a coin-receiving slide, which may also serve as a delivery-slide when it is applied to a machine for vending merchandise, or it may be used to release or set in action any mechanism which may be contained within the casing.

The slide B, which is of the same thickness as the coin required to operate the machine, moves in a suitable slideway, consisting in the present instance of two plates $a\,b$, fitting closely against its upper and lower surfaces, the upper plate $a$ being preferably composed of hardened steel and of such length as to extend slightly beyond the front edge of the coin-opening $c$ in the slide B, said opening $c$ being of slightly-larger diameter than the coin which it is intended to receive. In the front end of the plate $a$, immediately over the opening $c$ when the slide B is drawn out, is formed a circular opening $d$ of the exact size to allow the proper coin to pass through it and drop into the opening $c$ of the slide B, and by making said opening $c$ of slightly-larger diameter than the opening $d$ it will be obvious that it will be impossible to jam a piece of metal or other substance into the opening $c$ with a view to have it remain there to repeatedly operate the machine, for the reason that a piece or disk which will pass through the upper opening $d$ will fit loosely within the coin-opening $c$, and will consequently drop out of the latter when the slide is pushed in to operate the machine.

To facilitate the removal of any tightly-fitting disk or article from the opening $c$, an opening $e$ is cut through the front end of the plate $a$, which registers with a notch 12 at the edge of the coin-opening $c$, thus enabling the point of a knife or other instrument to be inserted beneath the coin or article to remove the same, if desired.

The front sharp edge of the coin-opening $c$ coöperates with the cutting edge 14, Fig. 9, of the opening $d$ as the slide B is pushed in, shears being thus provided to sever any wire or string which may be attached to a coin with a view to recover the same on drawing back the slide after the machine has been operated.

The turned-up end 15 of the slide B, which forms a handle, has a narrow neck 16, Fig. 4, which passes through the opening $e$ into and across the opening $d$ as the slide is pushed in, thus giving a longer range of movement to the slide without unnecessarily increasing its length.

Between a pair of ears projecting from the under side of the lower plate $b$ is pivoted at 20 a feeling-lever D, the upper short arm of which is preferably provided with a sharp-edged steel antifriction-roll $g$, which projects through a slot $i$ in the plate $b$, located at the center of its width, so that the coin-opening $c$ will pass centrally over it as the slide B is pushed in. $k$ is a stiff spring which acts against the long arm of the lever D and causes its roll $g$ to bear with considerable force against the under side of the slide B and be brought into contact with the coin or article in the opening $c$ as said slide is pushed in, so that when the coin is of the proper thickness and diameter the lever D will remain stationary during the operation of pushing in the slide, the coin dropping out through an opening $m$ in the plate $b$ into a chute E and thence into a suitable coin-receptacle (not shown) when the slide is at or near the limit of its inward movement.

The lower end of the long arm of the feeling-lever D is connected by a pin and slot with a lever G, fulcrumed at 22 to a hanger $h$, secured to the under side of the plate $b$, its long arm, which forms a locking-pawl, having a sharp point or tooth 23, which when carried upward by a slight movement of the long arm of the feeling-lever, due to its coming into contact with a coin or disk of less than the normal thickness, engages one of a series of ratchet-teeth 24 on the under side of the slide B, thus securely locking the same and instantly arresting its inward movement. It will be noticed that the feeling-lever D is fulcrumed a short distance only from its upper or feeling end, while the pawl-lever G, with which it is connected, is fulcrumed near its lower end. Consequently a very slight upward movement of the feeling end of the lever D will produce a very considerable upward movement of the long arm of the pawl-lever G, the ratio of movement between the two levers being such that when a coin of less than the proper thickness is placed within the opening $c$ it will on reaching the feeling-roll $g$ of the lever D permit the latter to rise an amount equal to the deficiency in the thickness of the coin and cause the point of the pawl-lever to engage the ratchet-teeth of the slide B, and thus instantly lock it, as described, and prevent the machine from being operated until a coin of the proper size and thickness is placed within the opening $c$.

If the slide B is pushed in with the coin-opening $c$ empty, the feeling-lever will enter said opening and operate the pawl-lever to lock the slide, a similar action taking place if a washer is used, as the feeling-roll will enter its central opening as the slide is pushed in. If a blank or token of the proper size and thickness composed of lead, pasteboard, or other soft material is placed within the coin-opening $c$, it will on its arrival over the sharp-edged roll $g$ be cut into or indented by the same as it passes in contact therewith, the spring $k$ being of sufficient strength to cause the feeling-roll $g$ to sink into the soft substance, when the slight upward movement of the feeling end of the feeling-lever D thus produced will cause the pawl to engage the coin-slide and prevent it from being pushed in.

The coin-slide B is pushed inward against the resistance of a spring $p$, one end of which is fastened to a post 25, projecting from the under side of the plate $b$, and the other end secured to a projection $r$ on the slide, said spring serving to return the slide to its normal outward position, (shown in Figs. 1 and 2,) with the opening $c$ ready to receive a coin.

To relieve the slide B of the friction of the roll $g$ while being returned to its normal outward position by the spring $p$, we employ a horizontal slide I, secured to the hanger $h$ by screws $s$ $s$, passing through a slot $t$. This slide I is provided at one end with a cam or incline 26, which when the slide is moved in the direction of the arrow acts on a pin 30, projecting laterally from the end of the pawl-lever G, to depress the same and through its connection with the feeling-lever withdraw the latter out of contact with the coin-slide B. The movement of the slide I in the direction of the arrow is produced by the contact with a shoulder 31 thereon of the first ratchet-tooth of the slide B, (see Fig. 6,) which takes place when said slide has nearly reached the limit of its inward movement, the parts remaining in this position until just before the slide has reached the limit of its outward movement, (see Fig. 1,) when the projection $r$ will contact with the end of the slide I and move it back to release the lever G and permit the feeling-lever to again bear upon the under side of the slide, as required.

In case a coin of smaller diameter than required is placed within the opening $c$ it will drop through an opening 35 in the plate $b$ into a chute 36, said opening 35 being placed in front of the feeling-roll $g$, so that the small coin will drop out of the opening $c$ before the latter reaches said feeling-roll, which will, by entering said opening, prevent, as before described, the machine from being operated by a coin of smaller diameter than required.

Instead of a single spring-pressed feeling-lever only being used, as above described, a plurality of such levers arranged side by side may be employed, if desired, as shown in Fig. 8. In this case each lever, which is provided with a sharp-edged roll, acts independently and instead of being jointed to the pawl-lever G bears against the long pin 40, projecting laterally therefrom, so that a movement of either of the feeling-levers will be communicated to the pawl-lever to arrest the coin-slide in the same manner as previously described. Any suitable number of these feeling-levers may be employed to extend across the diameter of the coin-opening, so that if a narrow piece of metal of the proper thickness is placed within said opening a space or spaces will be left for one or more of the feeling-levers to enter and thus arrest the inward movement of the slide, and, if desired, two separate pawl-levers may be employed adapted to engage ratchet-teeth on opposite sides of the slide, in which case each pawl-lever would be connected with its own independent feeling-lever.

What we claim as our invention, and desire to secure by Letters Patent, is—

1. A fraud-preventive device for coin-operated machines or apparatus, comprising a slide having an opening to receive a coin of predetermined size, a spring-pressed feeling-lever arranged to bear against the under surface of said slide and adapted to contact with the coin as the slide is pushed in, and a locking pawl-lever operated by the feeling-lever and adapted to engage the coin-slide to lock the same and arrest its inward movement when the feeling end of the feeling-lever is permitted to rise, substantially as described.

2. In a coin-operated machine or apparatus, the combination with a slide having an opening for the reception of a coin, of a spring-pressed feeling-lever bearing against the under surface of said slide and adapted to contact with the coin as the slide is pushed in, and a locking pawl-lever operated by the feeling-lever and adapted when so operated to engage the coin-slide, said levers being so fulcrumed with respect to each other that a slight inward or upward movement of the feeling end of the feeling-lever will produce a sufficient movement of the pawl-lever to cause it to engage the coin-slide and thereby prevent its further inward movement, substantially as described.

3. In a coin-operated machine or apparatus, the combination with a slide having an opening for the reception of a coin, of a spring-pressed feeling-lever bearing against the under surface of said slide and adapted to contact with the coin as the slide is pushed in, and a locking pawl-lever operated by the feeling-lever and adapted when so operated to engage the coin-slide, said feeling-lever being provided at its feeling end with a sharp-edged antifriction-roll adapted to contact with and cut into any soft substance placed within the coin-opening of the slide, whereby a sufficient movement of the feeling-lever is produced to actuate the pawl-lever and cause it to engage the slide to prevent its further inward movement, substantially as described.

4. In a coin-operated machine or apparatus, the combination with the coin-slide, the spring-pressed feeling-lever and the pawl-lever operated by the said feeling-lever to lock the slide, of a cam-slide operated by the coin-slide when the latter has nearly reached the limit of its inward movement and acting to withdraw the pawl-lever and the feeling-lever out of contact with the coin-slide to relieve the latter of the friction of said levers during its outward movement, substantially as described.

5. In a coin-operated machine or apparatus, the combination with the coin-slide having an opening of slightly-greater diameter than the coin required to operate the machine, of a plate arranged directly over said slide and provided with an aperture of the exact diameter of the proper coin and registering with the coin-opening in the slide when the latter is drawn out, whereby the retention of a coin in the coin-slide after the latter has been pushed in is prevented, substantially as set forth.

6. In a coin-operated machine or apparatus, the combination with a slide having an opening for the reception of a coin, of a plurality of independently-operating spring-pressed feeling-levers bearing against the under surface of said slide and adapted to contact with the coin as the slide is pushed in, and the pawl or slide locking-lever adapted to be actuated by any one of said feeling-levers to lock the slide, substantially as described.

Witness our hands this 11th day of December, A. D. 1897.

JOHN G. W. ROMANS.
ALBERT D. GROVER.

In presence of—
P. E. TESCHEMACHER,
LOUISE A. CHACE.